Aug. 28, 1956  A. HACKER  2,761,109
SAFETY-TYPE CLAMP FOR ELECTRIC PLUG AND SOCKET
Filed Jan. 19, 1954
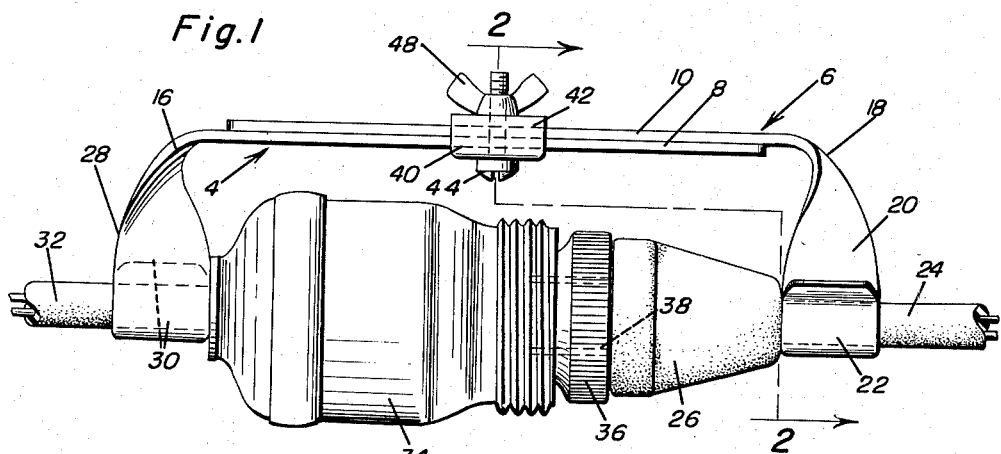
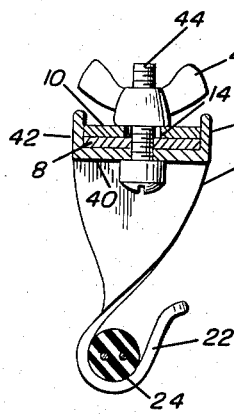
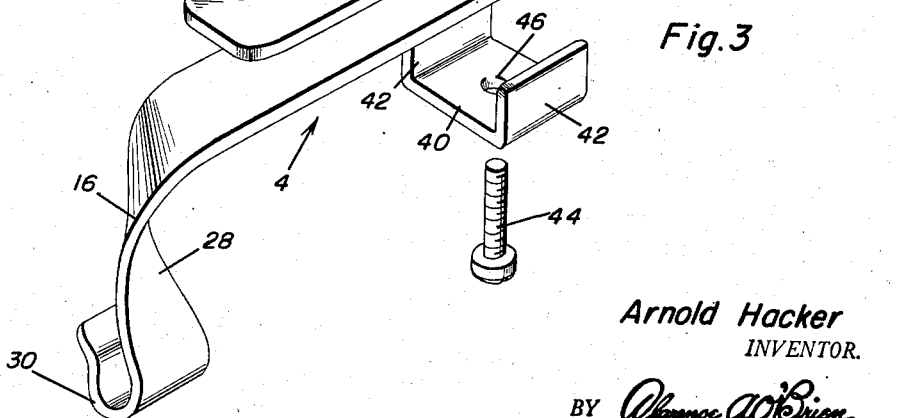
Arnold Hacker
INVENTOR.

United States Patent Office 2,761,109
Patented Aug. 28, 1956

2,761,109
SAFETY-TYPE CLAMP FOR ELECTRIC PLUG AND SOCKET

Arnold Hacker, Towson, Md.

Application January 19, 1954, Serial No. 404,957

2 Claims. (Cl. 339—77)

The present invention relates to a safety-type retainer which may be aptly described as a clamp, the same being especially adapted to maintain a reliable electrical connection between two current conducting cords or so-called conductors, the ends of which are separably connected by way of a socket and plug assembly.

It is a matter of common knowledge that any appreciable pull exerted on either electricity conducting cord might, under ordinary circumstances, cause the standard prong-equipped plug on one cord to be accidentally disconnected from a complemental receptacle or socket on the cooperating cord. This result often happens when one of the cords is a so-called appliance cord connected, for example, to an iron, vacuum cleaner, floor waxer and polisher, or the like. That is to say, the strain or pull exerted on an appliance cord will often cause the current supply plug to be separated. In fact, this problem is so well recognized that many and varied safety devices have been advocated by all of those who have seriously recognized and attempted to solve the problem. Therefore, it is an object of the present invention to structurally, functionally and otherwise improve upon safety clamps in the field of invention under consideration.

Another object of the invention is to provide a simple and economical two-part clamp which is such in construction, design and otherwise as to fulfill, it is believed, the ordinary requirements and needs of manufacturers, electrical equipment and appliance retailers, and users.

Along the same general lines it is an object to improve upon and reduce the number of parts entering into the combination, thereby not only increasing the efficiency of the structure as a whole, but rendering the same less costly to manufacture and otherwise simplify factors of assembling and sale.

In carrying out a preferred embodiment of the invention a two-part clamp is utilized and the parts are of similar construction in that they are provided at their clamping ends with simple hooks, the hooks being adapted to embrace the cord or cable and to bear against the adjacent plug, socket, or other part, as the case may be.

More specifically, the sections or components are of strip-like form and overlap and are bolted separably and adjustably and are provided at their respective outer ends with the aforementioned cord accommodating, embracing and end-thrust hooks.

Other objects, features, and advantages will become more readily apparent from the following description and the accompanying sheet of drawings.

In the drawings wherein like numerals are employed to designate like parts throughout the views:

Figure 1 is a side elevational view showing connectors such as a socket and plug assembly coupled with each other and serving to join connectible conductor cords and showing, what is more important, the safety clamp constructed in accordance with the invention and the manner in which the same is used;

Figure 2 is a section on the irregular line 2—2 of Figure 1, looking in the direction of the arrows; and Figure 3 is an exploded type, enlarged perspective view showing all of the details of the safety-type clamp.

Referring now to the drawings and especially to the construction seen in Figure 3, the overall safety-clamp is characterized, as before stated, by a pair of complemental sections or units which are conveniently denoted here by the numerals 4 and 6 respectively. These units are similar in construction and are constructed from flat strap or equivalent metal. The elongate horizontal strap or body portions are denoted respectively by the numerals 8 and 10. The strap 8 has a bolt hole 12 therein cooperable with an elongate slot 14 formed in the strap member 10. The outer end portions of the respective strap members are laterally bent, as denoted at 16 and 18 respectively. The end portion 18 at the right (appearing in Figure 3 in the drawings) is twisted between its ends as at 20 and is formed into a stirrup-like hook 22 to engage the cable or cord 24 and to abut the end of the attachable and detachable plug 26 carried by said cord. The end portion 16 is twisted in an opposite direction as at 28 and it is formed into a stirrup-like hook 30 which serves to seat and accommodate the other cord or cable 32 in the manner shown at the left in Figure 1. This particular cord is provided with a common screw-type socket 34 having a screw-in plug 36 which constitutes a female receiver or receptacle for the prongs 38 of the aforementioned plug 26. A U-shaped clip is provided as a stabilizer and this is denoted by the numeral 40 and it embraces the limbs or strap members 8 and 10 and has laterally directed end portions 42—42 which "box-in" the coacting longitudinal edge portions of the stated members whereby, upon passing the bolt 44 through the hole 46, hole 12 and slot 14, and applying the thumb nut 48, a satisfactory assemblage and adequate retainer is had. A simple interpretation is an extensible and retractable clamp made up of slidably cooperating sections adjustably and separably bolted and having hooks at the respective ends releasably seating the respective cords and abutting the respective coupling members 34 and 26 on said cords.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A safety retainer clamp for electric cords and coupling members for said cords, comprising a first section having a flat elongate rigid strap member provided between its respective ends with a bolt hole and provided at one end only with a laterally twisted end portion terminating in a stirrup-like bend defining a cord seating and embracing hook, a second complemental section having an elongate rigid strap members slidably overlapping the first named strap member and provided with a slot registering with said bolt hole, said second strap member being provided at its outer end with a laterally twisted end portion terminating in a second stirrup-like bend providing another cord seating and embracing hook, a bolt passing through said bolt hole and slot, and an assembling and clamping nut carried by the threaded portion of said bolt.

2. A safety retainer clamp for electric cords and coupling members for said cords, comprising a first section having a flat elongate rigid strap member provided between its respective ends with a bolt hole and provided at one end only with a laterally twisted end portion terminating in a stirrup-like bend defining a cord seating and embracing hook, a second complemental section having a flat elongate rigid strap member slidably overlapping the first named strap member and provided with a slot registering with said bolt hole, said second strap member being provided at its outer end with a laterally twisted end portion terminating in a second stirrup-like bend providing another cord seating and embracing hook, the bill portion of one hook extending in a direction opposite to the bill portion of the other hook, the seating and embracing portions of the respective hooks being coplanar and in approximate axial alignment with each other, and a substantially U-shaped stabilizing clip having a bight portion with a bolt hole therein aligned with the first named bolt hole and having laterally directed end portions abutting and firmly embracing coacting longitudinal edge portions of the respective limbs and assembling and holding the limbs in superimposed alignment with one another, a bolt passing through the respective bolt holes and slot and including a threaded shank, and a nut screwed on said shank and bound against a cooperating one of said limbs.

References Cited in the file of this patent

UNITED STATES PATENTS

| | | |
|---|---|---|
| 2,265,341 | Borchert | Dec. 9, 1941 |
| 2,406,567 | Schueneman | Aug. 7, 1946 |
| 2,461,427 | Kneebone | Feb. 8, 1949 |
| 2,473,321 | Yanko | June 14, 1949 |